2,846,444
Patented Aug. 5, 1958

2,846,444

PYRUVIC ACID-3-(p-METHOXY PHENYL)-1,2-DITHIOL-5-ONE AZINE

Arthur Luettringhaus and Ulrich Schmidt, Freiburg, Breisgau, Germany

No Drawing. Application December 17, 1952
Serial No. 326,592

Claims priority, application Germany December 20, 1951

2 Claims. (Cl. 260—327)

This invention relates to new sulfur containing organic compounds, and more particularly to new trithione derivatives, and a method of making same.

It is one object of this invention to provide new derivatives of trithiones, i. e. of 1,2-dithiol-5-thione compounds.

Another object of this invention is to provide new derivatives of such trithiones which are useful as dyestuffs, and other technical products, and as intermediates for the manufacture of such products.

A further object of this invention is to provide a simple, economic, and effective method of making such compounds.

Still further objects of this invention will become apparent from the specification and the examples given therein.

This invention consists in principle in reacting such trithiones in the form of their trithionium salts with compounds having a reactive amino group, especially with ketone reagents, i. e. with compounds which react with ketones by condensation, thereby splitting off water. The best known ketone reagents are, for instance, hydroxylamine, hydrazine, and their substitution products, such as aryl hydrazines, and others more. These ketone reagents form oximes, hydrazones, azines and other reaction products. Primary amines, such as aniline, which are capable of condensing with ketone compounds, thereby splitting off water and forming the corresponding azomethines may also be used for producing trithione condensation products according to this invention.

Condensation may also be effected with hydrazones. In this case mixed azines are obtained. Such mixed azines may also be produced by reacting hydrazine with a mixture of a carbonyl compound and a trithionium salt.

The reaction according to this invention proceeds, in principle, according to the following equation:

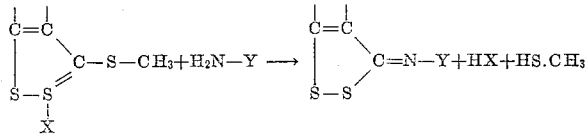

It follows that not only the acid corresponding to the anion X of the trithionium salt is formed but also a mercapto compound.

When reacting a mixture of a carbonyl compound and a trithionium salt with hydrazine, a mixed azine is formed according to the following equation

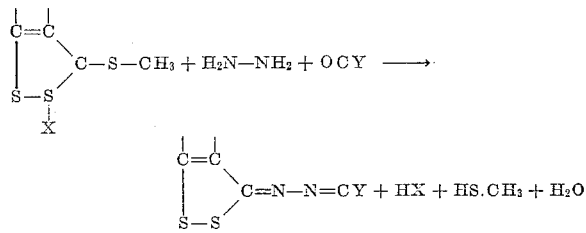

As trithionium salts there are preferably used the alkosulfates, such as the metho- and ethosulfates. The metho- sulfates are the most preferred reaction components since with said methosulfates the condensation proceeds very smoothly and with a high yield. The alkyhalogenides, the alkytoluene sulfonates and others may, of course, also be employed.

In general, it is of no importance which anion the trithionium salt is composed of.

The reaction is preferably carried out in solution in an organic solvent. Especially suitable are solvents which, at room temperature, are at least semisolid, or better, liquid, such as phenol, or organic acids, such as acetic acid, formic acid, propionic acid. Water, alcohols, pyridines and its homologues, hydrogenated pyridines and others may be used likewise, provided at least one of the reaction components is soluble in the corresponding solvent.

It was found that the condensation is considerably accelerated and favorably influenced by the catalytic action of amine salts. When working in glacial acetic acid, the acetate of the amino compound used for condensation exerts the desired catalytic effect. Should said amine acetate be too weakly basic—a fact which becomes readily apparent when the condensation reaction does not proceed at all or proceeds only very slowly—a strong base is added to the reaction mixture in order to supply sufficient amounts of catalyst. For instance, pyridine is a preferred base to be added since the pyridine acetate formed is a very active catalyst.

Other bases, such as dimethyl aniline, quinoline, isoquinoline, lutidines, picolines, collidine, triethanolamine, and other alkanolamines and others may, of course, also be used.

Inorganic bases may also be used. For instance, when working in glacial acetic acid and adding sodium hydroxide to the reaction mixture, the sodium acetate formed acts as active catalyst.

It is possible to carry out the condensation in the absence of solvents. In this case the reaction mixture is usually heated to melting while when working in the presence of solvents, heating to the boiling point of the solvent often is of advantage but is not in all cases necessary. When condensing the trithionium salts with ketone reagents in the molten state, the presence of the above mentioned amine salts as catalysts is not required.

It is furthermore possible to produce azines of trithiones by reacting trithionium salts with other azines whereby, under suitable reaction conditions, an exchange of the organic residue in said starting azines by a residue of the following structure

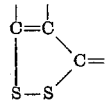

takes place.

The trithionium salts used as starting materials in the process of the present invention are produced, for instance, by causing addition of alkyl hayogenides, mono- and dialkyl sulfates, toluene sulfonic acid esters and other suitable compounds to the trithiones in a manner as described, for instance, by Bruno Boettcher and Arthur Luettringhaus in "Justus Liebigs Annalen der Chemie," vol. 557, pages 93 and 103 to 106, and by Bruno Boettcher and Fritz Bauer in "Justus Liebigs Annalen der Chemie," vol. 568, pages 230 to 232.

The new compounds are valuable products and find application for many purposes. A number of them represent effective therapeutic agents. The mixed azine of pyruvic acid and methoxy phenyl trithione, for instance, is an excellent choleretic agent. Other compounds have considerable bacteriostatic activity, some of them, for instance, are effective tuberculostatic agents. Other condensation products of this type may be used as dyestuffs, as additives in certain hydrocarbon fuel compositions, as intermediates of other chemical products and preparations, and for many other purposes.

The following examples serve to illustrate the invention without, however, limiting the same thereto.

*Example 1*

Anil of 3-(p-methoxy phenyl)trithione [5-phenyl imido-3-(p-methoxy phenyl)-1,2-dithiol or 1-phenyl imido-3-(p-methoxy phenyl)-4,5-dithiacyclopentene].

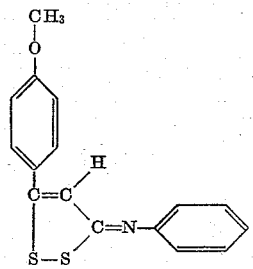

3.7 g. of "anethol trithione"-metho-sulfate prepared, for instance, as described by Bruno Boettcher and Fritz Bauer in "Justus Liebigs Annalen der Chemie," vol. 568, page 231, are heated to boiling with 2 g. of aniline in 25 cc. of glacial acetic acid and kept boiling for 2 minutes. 75 cc. of water are slowly added, while stirring, to said warm reaction mixture until it becomes turbid. The mixture is then allowed to stand for some time. The precipitate formed thereby is filtered off by suction. Yield: 3 g. of fine yellow crystals of the composition $C_{16}H_{13}ONS_2$. Melting point, after recrystallization from glacial acetic acid or acetic acid ethyl ester, acetone or acetonitrile: 144° C.

*Example 2*

Oxime of 3-(p-methoxy phenyl) trithione [3-(p-methoxy phenyl)-1,2-dithiol-5-one-oxime or 3-(p-methoxy phenyl)-4,5-dithiacyclopentenone-1-oxime].

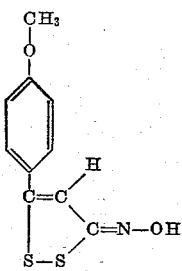

1.8 g. of "anethol trithione"-metho-sulfate are boiled with 1 g. of hydroxylamine acetate and 2 g. of pyridine in 20 cc. of glacial acetic acid for a few minutes. 50 cc. of water are slowly added to said reaction mixture until it becomes turbid. The mixture is then allowed to stand for some time. The precipitate formed thereby is filtered off by suction. Yield: 1 g. of yellow crystals of the composition $C_{10}H_9O_2NS_2$. Melting point: 170° C.

*Example 3*

Phenyl hydrazone of 3-(p-methoxy phenyl) trithione [3-(p-methoxy phenyl)-1,2-dithiol-5-one phenylhydrazone or 3-(p-methoxy phenyl)4,5-dithiacyclopentenone-1-phenyl hydrazone].

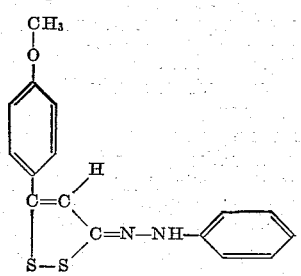

3.7 g. of "anethol trithione"-metho-sulfate are boiled with 2 g. of phenyl-hydrazine in 15 cc. of glacial acetic acid for a few minutes. 50 cc. of water are added to said reaction mixture, while stirring, until it becomes turbid. The mixture is then allowed to stand for some time. The precipitate formed thereby is filtered off by suction. Yield: 2.2 g. Recrystallization from glacial acetic acid and acetone yields yellow crystals of the composition $C_{16}H_{14}ON_2S_2$ and the melting point: 151° C.

*Example 4*

Azine of 3-(p-methoxy phenyl) trithione or bis-[3-(p-methoxy phenyl) - 1,2 - dithio-5-one]azine or bis-[3-(p-methoxyphenyl)-4,5-dithiacyclopentenone-1]-azine.

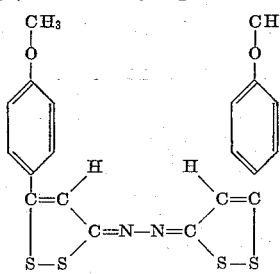

3.7 g. of "anethol trithione" methosulfate are dissolved in 20 cc. of glacial acetic acid. To this solution there is added, in 3 equal portions, a solution of 1 g. of hydrazine in 10 cc. of glacial acetic acid. The mixture is boiled for several minutes and the precipitated azine is filtered off by suction. The azine is boiled with water to remove any hydrazine salts present therein. Yield: 1.2 g. of a red crystalline powder having the composition $C_{20}H_{16}O_2N_2S_4$ and the melting point: 254° C. (after preceding sintering).

*Example 5*

Mixed azine of benzaldehyde and 3-(p-methoxy phenyl) trithione [benzal-3-(p-methoxy phenyl)-1,2-dithiol-5-one azine or benzal-3-(p-methoxy phenyl)-4,5-dithiacyclopentenone-1-azine].

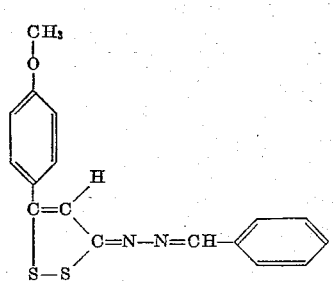

*Method (a).*—7.2 g. of "anethol trithione" methosulfate and 2.1 g. of benzaldehyde are dissolved in 30 cc. of glacial acetic acid. Half of a solution of 1.3 g. of hydrazine in 10 cc. of glacial acetic acid is added to said boiling solution. The mixture is boiled for a short time, the second half of the hydrazine solution is then added, the mixture is again boiled for 2 minutes and is filtered. 50 cc. of water are added to the filtrate until it becomes turbid. The resulting reaction product solidifies; it is filtered off by suction and is recrystallized from glacial acetic acid and acetic acid ethyl ester. Yield: 4 g. of orange crystals having the composition $C_{17}H_{14}ON_2S_2$ and melting at 143° C. and at 168° C. The compound is dimorphic.

*Method (b).*—2 g. of benzaldehyde hydrazone are added to a boiling solution of 6 g. of "anethol trithione" methosulfate and 2 g. of pyridine in 30 cc. of glacial acetic acid. The mixture is boiled for 2 minutes. 50 cc. of water are added thereto, while stirring, until it becomes turbid. 4 g. of a crystalline crude product precipitate. They are filtered off by suction and are recrystallized from glacial acetic acid and acetic acid ethyl ester and melt at 143° C. and at 168° C. This compound is identical with the compound obtained according to method (a).

*Example 6*

Mixed azine of N-methyl benzthiazolone and 3-(p-methoxy phenol) trithione [N-methyl benzthiazolone-3-(p-methoxy phenyl)-1,2-dithiol-5-one azine or N-methyl benzthiazolone-3-(p-methoxy phenyl)-4,5-dithiacyclopentenone-1-azine].

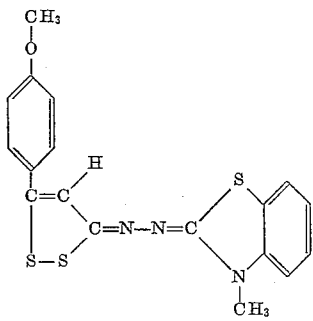

3.6 g. of "anethol trithione"-methosulfate are boiled with 1.8 g. of N-methyl benzthiazolone hydrazone and 5 g. of pyridine in 20 cc. of glacial acetic acid. 50 cc. of water are added to said solution until it becomes turbid. The mixture is allowed to stand for some time and the precipitate is filtered off by suction. Yield: 3 g. of a crude product which, on recrystallization from glacial acetic acid, yields light orange iridescent platelets of the composition $C_{18}H_{15}ON_3S_3$ and the melting point: 177° C.

*Example 7*

Mixed azine of pyruvic acid and 3-(p-methoxy phenyl) trithione [pyruvic acid-3-(p-methoxy phenyl)-1,2-dithiol-5-one azine or pyruvic acid-3-(p-methoxy phenyl)-4,5-dithiacyclopentenone-1-azine].

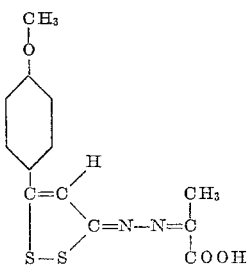

3.6 g. of "anethol trithione"-methosulfate and 1 g. of pyruvic acid are dissolved in 75 cc. of glacial acetic acid. The solution is heated to boiling. 0.8 cc. of hydrazine hydrate are added thereto drop by drop and boiling is continued for one minute. The mixture is then diluted with 200 c. of water. The precipitate is filtered off and dissolved in 200 cc. of hot, 5% potassium carbonate solution. The solution is boiled with decolorizing carbon, filtered, and acidified with 100 cc. of 10% sulfuric acid. The resulting precipitate is filtered off by suction and yields, on drying, 1.5 g. of a product which, on recrystallization from glacial acetic acid, is converted into a yellowish-green crystal powder, melting at 159° C. The compound is a valuable choleretic agent.

*Example 8*

Benzoyl hydrazone of 3-(p-methoxy phenyl) trithione [3-(p-methoxy phenyl)-1,2-dithiol-5-one benzoyl hydrazone or 3-(p-methoxy phenyl)-4,5-dithiacyclopentenone-1-benzoyl hydrazone].

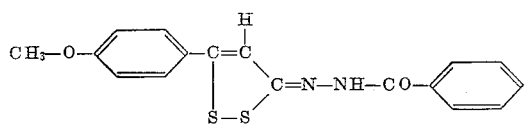

3.6 g. of "anethol trithione"-methosulfate is heated to boiling with 1.4 g. of benzhydrazide in 30 cc. of glacial acetic acid. 2 g. of pyridine are added. Boiling is continued for 5 minutes and 100 cc. of water are slowly added. The resulting precipitate is filtered off by suction and recrystallized from butanol, thereby treating the solution with activated carbon. 1.8 g. of light yellow felted needles of the composition $C_{17}H_{14}O_2N_2S_2$ and the melting point: 164–165° C. are obtained.

*Example 9*

γ-Pyridoyl hydrazone of 3-(p-methoxy phenyl) trithione [3-(p-methoxy phenyl)-1,3-dithiol-5-one-γ-pyridoyl hydrazone or 3-(p-methoxy phenyl)-4,5-dithiacyclopentenone-1-γ-pyridoyl hydrazone].

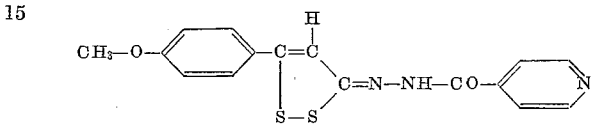

2.8 g. of "anethol trithione"-methosulfate dissolved in 15 cc. of glacial acetic acid and 1 cc. of pyridine are boiled with 1.05 of pyridine-γ-carboxylic acid hydrazide for 3 minutes. After 10 minutes 50 cc. of water are added. The resulting reddish-yellow precipitate is filtered off by suction and is recrystallized from butanol. About 1.2 g. of an orange, acid-soluble hydrazone is obtained in fine platelets having the composition $C_{16}H_{13}O_2N_3S_2$ and melting at 212° C. (after preliminary sintering and softening beginning at 205° C.).

*Example 10*

3-(p-methoxy phenyl) trithione-p-aminobenzoic acid anil [5-(p-carboxy phenyl)-imido-3-(p-methoxy phenyl)-1,2-dithiol or 1-(p-carboxy phenyl)-imido-(p-methoxy phenyl)-4,5-dithiacyclopentene].

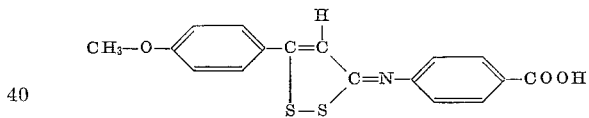

3.7 g. of "anethol trithione"-methosulfate are boiled with 1.4 g. of p-amino benzoic acid in 20 cc. of glacial acetic acid. 5 cc. of pyridine are added thereto and boiling is continued for 2 minutes. The anil is precipitated by addition of 15 cc. of water. After cooling, the precipitate is filtered off by suction and is washed with 90% acetic acid. The difficultly soluble compound is recrystallized from large amounts of glacial acetic acid or butanol. A yellow crystalline powder is obtained having the composition $C_{17}H_{13}O_3NS_2$ and melting at 257° C. (sintering beginning from 250° C.). Yield: 2.6 g.

*Example 11*

3-(p-methoxy phenyl) trithione-p-amino dimethyl aniline anil [5-(p-dimethyl amino phenyl) imido-3-(p-methoxy phenyl)-1,2-dithiol or 1-(p-dimethylamino phenyl)-imido-(p-methoxy phenyl)-4,5-dithioacyclopentene].

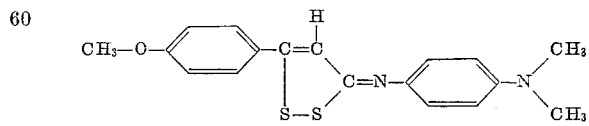

3.6 g. of "anethol trithione"-methosulfate and 2 cc. of p-amino dimethylaniline are boiled for a short period of time in 30 cc. of glacial acetic acid and 3 cc. of pyridine. 200 cc. of water are then added to precipitate the anil. The precipitate is filtered off by suction and is purified by dissolving in warm 10% hydrochloric acid, filtering, and precipitating by means of potassium carbonate solution. On recrystallization from glacial acetic acid, orange crystals are obtained having the composition $C_{18}H_{18}ON_2S_2$ and melting at 176° C. Yield: 2.5 g.

The preceding examples show in what manner trithione methosulfates are used as the one reaction component. It is, of course, possible to use equimolecular amounts of other trithione methosulfates in the same manner.

*Example 12*

3-(p-methoxy phenyl)-trithione-p-amino salicylic acid anil.

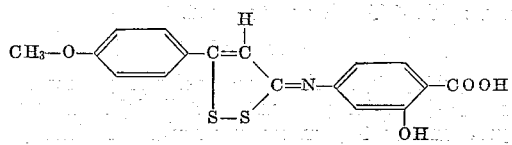

10 g. of 5-thione-3-(p-methoxy phenyl)-1,2,-dithiol dimethyl-sulfate are dissolved in 50 cc. glacial acetic acid while heating. A solution of 8 g. of the sodium salt of p-amino salicylic acid or the equimolecular amount of the free acid in 500 cc. of glacial acetic acid is added thereto and the mixture is heated to boiling for about 10 minutes. On cooling, a reddish-yellow crystalline compound precipitates. It is washed with water and subsequently with acetone and finally with ether. On recrystallization from pyridine, orange needles of the composition $C_{17}H_{13}O_4NS_2$ and of the melting point: 212–215° are obtained. There is every indication that said compound has the structure indicated by the above given formula.

All the preceding examples were carried out with trithionium salts of "anethol trithione." The following example will demonstrate that the process according to this invention may also be carried out with other trithiones or their trithionium salts respectively.

*Example 13*

Benzotrithione-(2-amino benzthiazol)-anil [5-(2'-benzthiazolyl imido)-3,4-benzo-1,2-dithiol or 1-(2'-benzthiazolyl imido)-2,3-dithiaindone].

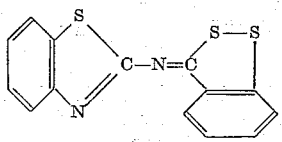

5 g. of "benzotrithione" are heated on the water bath in 20 cc. of water-free benzene with 7 cc. of dimethylsulfate for 1½ hours. The mixture is allowed to cool. The precipitated methosulfate is filtered off by suction after 5 hours. It is dissolved in 25 cc. of glacial acetic acid. 5 g. of amino benzthiazole are dissolved in 25 cc. of glacial acetic acid and 5 cc. of pyridine. This solution is boiled with the above described solution of the benzotrithione-methosulfate for 10 minutes. After cooling, 5 g. of the precipitated crude compound are filtered off by suction. Recrystallization from amyl alcohol and pyridine yields yellow crystals having the composition $C_{14}H_8N_2S_3$ and melting at 213° C.

In the place of the trithionium salts employed as the one reaction component in the preceding examples, other trithionium salts, in equimolecular proportions, may be used likewise. The following list mentions a number of such compounds without, however, limiting this application thereto. These trithionium salts are prepared in an analogous manner as described by Bruno Boettcher and Arthur Luettringhaus in "Justus Liebigs Annalen der Chemie," vol. 557, pages 93 and 103 to 106, and by Bruno Boettcher and Fritz Bauer in "Justus Liebigs Annalen der Chemie," vol. 568, pages 230 to 232 by the addition of alkyl halogenides, alkyl sulfates, alkyl toluene sulfonates, and the like agents.

3-phenyl trithione-methosulfate
3-(p-methoxy phenyl) trithione-ethosulfate
3-(p-methoxy phenyl) trithione-methochloride
3-(p-methoxy phenyl) trithione-methobromide
3-(p-methoxy phenyl) trithione-methoiodide
3-(p-methoxy phenyl) trithione-ethochloride
3-(u-methoxy phenyl) trithionediethylsulfate
3-(p-methoxy phenyl) trithione alkyl toluene sulfonates
3-(m,p-dihydroxy phenyl) trithionium salts
Camphor trithionium salts
3-furyl trithionium salts
Allyl benzene trithionium salts
4-methyl-1,2-dithia-4-cyclopentene-3-thionium salts
4-neopentyl-1,2-dithia-4-cyclopentene-3-thionium salts
4-methyl-5-tertiary butyl-1,2-dithia-4-cyclopentene-3-thionium salts
Propylene trithionium salts
2,3-dimethyl trithionium salts
2-phenyl trithionium salts
2,3-diphenyl trithionium salts
3-(p-hydroxy phenyl) trithionium salts
3-(p-dimethylamino phenyl) trithionium salts
2-carbethoxy-3-phenyl trithionium salts
2-phenyl-3-carbomethoxy trithionium salts
2-methyl-3-carbomethoxy trithionium salts
3-α-furyltrithionium salts
3-α-thienyl trithionium salts
Pinene trithionium salts
3-(3',4'-methylendihydroxyphenyl) trithionium salts
3-methyl-2-propyl trithionium salts
3-(3',4'-dimethoxy phenyl) trithionium salts
Trimethylene trithionium salts
Tetramethylene trithionium salts
3-methyl-2-(β-diethylamino ethyl) trithionium salts, and others.

In the place of the ketone reagents used in the above given examples, there may be employed other ketone reagents, especially hydrazine compounds having one reactive amine group. Following a number of such ketone reagents are listed without, however, limiting this application thereto:

Acethydrazide
p-Nitro phenyl hydrazine
2,4-dinitro phenyl hydrazine
p-Bromo phenyl hydrazine
Benzyl phenyl hydrazine
β-Naphthyl hydrazine
Betaine hydrazide (Girard reagent)
Pyridine-β-carboxylic acid hydrazide, and other aryl hydrazines, acyl hydrazines and other ketone agents.

Other primary amines of the aniline type than those mentioned in the preceding examples and primary amines which contain further functional groups, such as p-amino benzoic acid, p-amino salicylic acid, p-amino dialkyl anilines may also be employed.

When working in the absence of solvents, the reaction mixture is heated to cause complete homogenization of said mixture. This stage is reached when the odor of mercaptan becomes noticeable. In most cases, heating to melting gives satisfactory results.

Of course, many changes and variations in the reaction conditions, the reaction temperature and duration, the starting materials, ketone reagents, and amines used, the solvents and catalysts employed, the methods of working up the condensation products and of purifying the same may be made by those skilled in the art in accordance with the principles set forth herein and in the claims annexed hereto.

Further amines, which may be condensed, are toluidines, xylidines, amino benzthiazole, anthranilic acid, sulfanilic acid.

As to the therapeutic effects of the new compounds it may be mentioned additionally that the mixed azine from anethol trithione and pyroracemic acid has a remarkable choleretic action.

*Example 14*

Phenyl hydrazone of 3-(p-methoxy phenyl) trithione [3-(p-methoxy phenyl)-1,2-dithiol-5-one phenylhydrazone or 3-(p-methoxy phenyl)-4,5-dithiacyclopentenone-1-phenyl hydrazone].

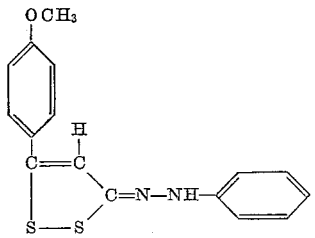

2,9 g. of "anethol trithione"-methochloride are boiled with 2 g. of phenyl-hydrazine in 50 cc. of glacial acetic acid for a few minutes. 50 cc. of water are added to said reaction mixture, while stirring until it becomes turbid. The mixture is then allowed to stand for some time. The precipitate formed thereby is filtered off by suction. Yield: 2.2 g. Recrystallization from glacial acetic acid and acetone yields yellow crystals of the composition $C_{16}H_{14}ON_2S_2$ and the melting point: 151° C.

*Example 15*

3-phenyl-trithione-p-aminosalicylic acid anil.

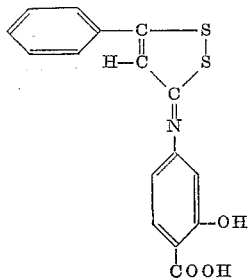

3 g. of phenyl-trithione methosulfate are boiled in 50 cc. of glacial acetic acid and 2 cc. of pyridine with 1,5 g. of p-amino salicylic acid for 10 minutes. Water is added and the resulting precipitate is filtered off by suction. The residue is dissolved in a hot aqueous solution of potassium carbonate; it is filtered off and precipitated with a mineral acid. 1.5 are obtained. Recrystallization from butanol results in orange coloured crystals. $C_{16}H_{12}NO_3S_2$. Melting point 217° C.

*Example 16*

Anil of 3-(p-methoxy phenyl) trithione [5-phenyl imido-3-(p-methoxy phenyl)-1,2-dithiol or 1-phenyl imido-3-(p-methoxy phenyl)-4,5-dithiacyclopentene].

3.6 g. of "anethol trithione"-methosulfate are mixed, while heating to boiling with 2 cc. of aniline. Heating is continued for some minutes at 100° C. The reaction mixture is filtered off by suction and washed with a small amount of methyl alcohol and water of 0° C. Recrystallization from glacial acetic acid yields the above indicated product.

*Example 17*

Anil of 3-(p-methoxy phenyl)trithione[5-phenyl imido-3-(p-methoxy-phenyl)-1,2-dithiol or 1-phenol imido-3-(p-methoxy phenyl-4,5-dithiacyclopentene].

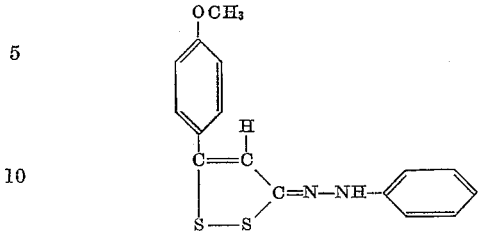

3.7 g. of "anethol trithione"-methosulfate are heated with 2 cc. of aniline in 30 g. of molten phenol for 5 minutes to 140° C. The mixture is poured into water and sodium hydroxide is added until all the phenol is dissolved.

After allowing the mixture to stand for a short period of time, the precipitate crystallizes. It is filtered off by suction and the reaction product is recrystallized from acetone. Yield 3 g.

*Example 18*

To a boiling solution of 3.6 g. of "Anethol trithione" methosulfate in 20 cc. glacial acetic acid slowly a mixture of 2.1 g. benzalazin in 10 cc. of 80% acetic acid is added. It is boiled until no more methyl mercaptane is developed. Water is added and after some time the resulting precipitate is filtered off by suction. After recrystallization from glacial acetic acid and acetic acid ethyl ester 1.5 g. orange coloured crystals are obtained. The product is identical with the product obtained according to Example 5.

We claim:
1. As a new compound, a condensation product of pyruvic acid and 3-(p-methoxy phenyl) trithione with hydrazine, said condensation product having choleretic activity, and produced by boiling in glacial acetic acid with the addition of a basic catalyst.

2. In a process of preparing a mixed azine of pyruvic acid and 3-(p-methoxy phenyl) trithione, the steps comprising adding to a boiling mixture of pyruvic acid and 3-(p-methoxy phenyl) trithionium methosulfate in glacial acetic acid hydrazine hydrate, continuing boiling for a short period of time until condensation is completed, diluting the reaction mixture with water, and separating the precipitated mixed azine.

References Cited in the file of this patent

Luettinghaus et al.: Annalen der Chemie, vol. 560, pages 201–14 (1947).

Boettcher et al.: Chem. Abstracts, vol. 42, columns 905, 906 (1948); Abstract of Annalen der Chemie, vol. 557, pages 89–107 (1947).

Degering: An Outline of Organic Nitrogen Compounds (1945), pages 176, 384.

Sidgwick: The Organic Chemistry of Nitrogen, new ed., revised and rewritten by Taylor and Baker (1942), pages 393–399.